United States Patent
Sakiyama et al.

(10) Patent No.: US 6,567,726 B2
(45) Date of Patent: May 20, 2003

(54) VEHICLE DRIVING SUPPORT SYSTEM, AND STEERING ANGLE DETECTION DEVICE

(75) Inventors: Kazuhiro Sakiyama, Kobe (JP); Toshihiro Shimizu, Kobe (JP); Kazuya Sako, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/146,886

(22) Filed: May 17, 2002

(65) Prior Publication Data

US 2002/0128754 A1 Sep. 12, 2002

Related U.S. Application Data

(62) Division of application No. 09/695,849, filed on Oct. 26, 2000.

(30) Foreign Application Priority Data

Oct. 27, 1999 (JP) .......................................... 11-305305

(51) Int. Cl.⁷ .............................. H06F 17/00; H06F 7/00
(52) U.S. Cl. .............................. 701/1; 701/23; 701/41; 701/72; 340/901
(58) Field of Search .............................. 701/1, 35, 36, 701/49, 58, 59, 23, 25, 41, 72; 307/10.1; 340/901, 903, 937

(56) References Cited

U.S. PATENT DOCUMENTS

| | | | |
|---|---|---|---|
| 4,723,218 A | 2/1988 | Hasebe et al. | 701/208 |
| 5,097,917 A * | 3/1992 | Serizawa et al. | 180/402 |
| 5,261,503 A * | 11/1993 | Yasui | 180/446 |
| 5,281,901 A | 1/1994 | Yardley et al. | 318/587 |
| 5,530,420 A | 6/1996 | Tsuchiya et al. | 340/435 |
| 5,793,325 A | 8/1998 | Yamada | 342/70 |
| 6,244,372 B1 * | 6/2001 | Sakamaki et al. | 180/422 |
| 6,291,815 B1 * | 9/2001 | Sugiyama et al. | 250/231.13 |

FOREIGN PATENT DOCUMENTS

| | | |
|---|---|---|
| DE | 28 21 691 A1 | 12/1978 |
| EP | 1 022 903 | 7/2000 |
| JP | 57-150044 | 9/1982 |
| JP | 64-14700 | 1/1989 |
| JP | 4-239400 | 8/1992 |
| JP | 5-143894 | 6/1993 |
| JP | 6-255423 | 9/1994 |
| JP | 7-44799 | 2/1995 |
| JP | 7-192199 | 7/1995 |
| JP | 10-257482 | 9/1998 |
| JP | 10-283592 | 10/1998 |
| JP | 10-288255 | 10/1998 |
| JP | 10-301207 | 11/1998 |
| JP | 10-301208 | 11/1998 |
| JP | 11-179718 | 7/1999 |
| JP | A 2000-127851 | 5/2000 |
| JP | A 2000-134608 | 5/2000 |
| JP | A 2000-177483 | 6/2000 |
| JP | A 2000-177512 | 6/2000 |
| WO | WO 96 38319 | 12/1996 |

\* cited by examiner

Primary Examiner—Gertrude Arthur
(74) Attorney, Agent, or Firm—Oliff & Berridge PLC

(57) ABSTRACT

A camera unit 10 is mounted on a vehicle 3. When an attempt is made to park the vehicle 3 in a parking lot, a predicted path 5a and guidelines 5b are displayed on an information display 4 together with an image. Data to be used for displaying the predicted path 5a and the guidelines 5b are stored beforehand in internal memory of an image processing circuit 19 provided in a parking assist ECU 6 so that the data can be selected in accordance with specifications, such as the type of the vehicle 3. The predicted path 5a is computed on the basis of a steering angle detected by a steering angle sensor provided in an exposed portion of the steering shaft 11. The length or color of the predicted path 5a is changed in accordance with the speed of the vehicle 3. Further, a vehicle driving support system is provided with a back sonar 17, and hence the length or color of the predicted path 5a is also changed in accordance with the result of detection of an obstacle.

13 Claims, 12 Drawing Sheets

US 6,567,726 B2

VEHICLE DRIVING SUPPORT SYSTEM, AND STEERING ANGLE DETECTION DEVICE

This is a Division of Application Ser. No. 09/695,849 filed Oct. 26, 2000. The entire disclosure of the prior application is hereby incorporated by reference herein in its entrety.

BACKGROUND OF THE INVENTION

1. Field of Invention

The present invention relates to a driving support system which displays information for supporting the operation of a vehicle in conjunction with an image showing a view toward the direction in which the vehicle is traveling. Further, the present invention relates to a steering angle detection device for detecting a steering angle of the vehicle on the basis of driving support information.

2. Description of Related Art

Sufficient ascertaining of the surroundings of a vehicle is necessary for accomplishing safe driving. The driver ascertains the surroundings of his vehicle primarily by means of the sense of sight. Since the driver has to look outside the vehicle from the driver's seat in the vehicle's cabin, the driver's field of view is obstructed by the vehicle body. In order to ensure the driver's field of view, a proposal has hitherto been made for supporting a driver's operation by means of displaying an image of the outside of the vehicle on a display panel located in the vicinity of the driver's seat, through use of an image pick-up device, such as a video camera, attached to the vehicle.

The present inventor has hitherto made various proposals for supporting such an image-based driver's operation, as described in, for example, Japanese Patent Application Laid-Open Nos. 288255/1998, 301207/1998, 301208/1998, 353425/1998, 353426/1998, and 179718/1999.

Vehicle driving support is effective particularly when an attempt is made to park a vehicle. As a conventional art technique for supporting a driver's parking operation, for example, Japanese Patent Application Laid-Open No. 14700/1989 describes a technique of displaying, on a screen, an image concerning a rearward or rear oblique when the vehicle is rolling backward and a predicted path of the vehicle. According to the prior technique, an image of predicted path based on a steering angle of the vehicle is displayed with and is superimposed on a rearview image. Accordingly, it is predicted that the driver can simultaneously ascertain a steering angle and the rearward safety of the vehicle. There is also described the idea of displaying the contour of a vehicle so as to be superimposed on the vehicle's predicted path, thereby facilitating the driver's intuitive ascertainment of distance. Further, Japanese Patent Application Laid-Open No. 44799/1995 describes a conventional art technique of detecting the length of a parking space through use of various sensors and assisting a driver's operation by means of informing the driver of whether or not the vehicle can be parked in the parking space in a case where the driver attempts to park his vehicle between vehicles arranged end to end or put his vehicle into a garage. The patent application also describes that the amount of steering operation is computed from data pertaining to the position of a parking space and data pertaining to the characteristics of a vehicle, to thereby provide a display for driving support purpose or perform an automatic control operation.

Conventional art techniques for supporting driving operations by means of capturing an image of surroundings of a vehicle are described in, for example, Japanese Utility Model Application Laid-Open No. 150044/1982 and Japanese Patent Application Laid-Open Nos. 239400/1992, 143894/1993, 255423/1994, 192199/1995, 257482/1998, and 283592/1998.

Japanese Utility Model Application Laid-Open No. 150044/1982 describes the technique of supporting driving operation by means of switching a screen of a display from a normal screen image for indicating selected information under normal operation to an anomalous display screen for indicating information about an anomalous state. Japanese Patent Application Laid-Open No. 239400/1992 describes the technique of capturing images of surroundings in desired locations through use of a camera which is attached to the vehicle's ceiling by way of a rotary pan head and which is rotatable through 360° in a horizontal direction, subjecting the thus-captured images to image processing so as to make them easily readable for the driver, and displaying the thus-processed images on a display unit simultaneously or in a split screen, as required. Japanese Patent Application Laid-Open No. 143894/1993 describes the technique of capturing images of a vehicle in a left forward direction, a forward direction, and a right forward direction of the vehicle through use of three cameras, displaying the thus-displayed images in a three-way split screen, and changing the proportion of the display area of the leftward image to the display area of the rightward image within the split display in accordance with a steering angle. Japanese Patent Application Laid-Open No. 255423/1994 describes the technique of displaying an image captured by a camera together with range scales based on a distance measured by a range sensor, and displaying an image concerning surroundings of obstacles in a scaled-up manner, in a size so as to match the distance, thereby assisting driving operation. Japanese Patent Application Laid-Open No. 192199/1995 describes the technique of three-dimensionally analyzing an obstacle on the basis of a stereoscopic image, computing the distance between an extension of the side of a vehicle and the obstacle, computing a clearance between the vehicle and the obstacle, and displaying the thus-computed clearance when the vehicle passes through a narrow path. Japanese Patent Application Laid-Open No. 257482/1998 describes the technique of displaying an image in the form of a seamless single frame by means of merging a rearview, a left-side view, and a right-side view of the vehicle into a single image. Japanese Patent Application Laid-Open No. 283592/1998 describes the technique of three-dimensionally analyzing an image captured by a camera, determining the chance of contact arising between a vehicle and an obstacle, informing a driver of the result of determination, and displaying the spatial relationship between the vehicle and the obstacle.

Even when driving support is effected on the basis of an image, the driver must determine circumstances directly on the basis of his vision, and a display for assisting driving operation must be utilized for only auxiliary purpose. A limitation is imposed on the size of display means situated in the vicinity of a driver's seat. Display of a predicted path of a vehicle together with an image is preferable for effectively assisting driving operation. A predicted path of the vehicle corresponds to information—which the driver can never gain by means of looking directly at surroundings—and is very useful.

A predicted path of the vehicle displayed in an image captured by a camera or the like should be changed by an angle of the camera mounted on a vehicle body, a steering angle of the vehicle, the width of the vehicle body, and a wheelbase. A path cannot be accurately predicted without matching data pertaining to these items with an actual vehicle, and hence effective driving support cannot be effected. In terms of productivity of manufactured products, a driving support system is desirably mountable on vehicles of many types. Preferably, required data can be readily input in accordance with the specifications of an individual vehicle. Further, under the present circumstances, a vehicle is not usually provided with a sensor for detecting the steering angle of a vehicle, which is required for predicting a path. Therefore, simplest detection of a steering angle is desirable.

SUMMARY OF THE INVENTION

An object of the present invention is to provide a vehicle driving support system and a steering angle detection device, which easily compensates for a difference in specifications of a vehicle on which the system is to be mounted, and which enables highly-accurate support.

Accordingly, the present invention provides a vehicle driving support system which captures an image of the surroundings of a vehicle through use of a camera and displays on display means driving support information along with the captured image, the system comprising:

a steering angle sensor for detecting a steering angle of a vehicle;

travel prediction means which predicts a travel path of the vehicle on the basis of a steering angle detected by the steering angle sensor and computes the thus-predicted travel path as a predicted travel curve;

memory in which, in connection with specifications of any of a plurality of vehicles, there are stored beforehand data pertaining to the space which would be occupied when a vehicle travels along a predicted travel curve computed by the travel prediction means;

selection operation means by way of which an input operation is performed for selecting data to be stored in the memory, in accordance with specifications of a vehicle; and control means which computes, as driving support information, a path pertaining to a space by which the vehicle is predicted to pass in accordance with travel of the vehicle on the basis of the predicted travel curve predicted by the travel prediction means and through use of the data selected by means of an input operation of the selection operation means, and which causes the display means to display the computed path.

According to the present invention, the vehicle driving support system for displaying driving support information along with an image of the surroundings of a vehicle comprises a camera, display means, a steering angle sensor, travel prediction means, memory, selection operation means, and control means. The steering angle sensor detects a steering angle of the vehicle. The travel prediction means predicts the travel path of the vehicle on the basis of the steering angle detected by the steering angle sensor and computes the thus-predicted travel path as a predicted travel curve. In memory, in connection with specifications of any of a plurality of vehicles there are stored beforehand data pertaining to the space which would be occupied when a vehicle travels along the predicted travel curve computed by the travel prediction means. By way of selection operation means, an input operation is performed for selecting data to be stored in the memory, in accordance with specifications of a vehicle.

On the basis of the predicted travel curve predicted by the travel prediction means, control means computes, as driving support information, a path pertaining to a space by which the vehicle is predicted to pass in accordance with travel of the vehicle, through use of the data selected by means of an input operation of the selection operation means. The thus-computed path is displayed on the display means. When the path is displayed on the display means along with an image, the predicted path is displayed so as to match the video to be displayed on the display means. A highly-accurate predicted path is displayed, to thereby provide easily-understandable driving support. Data pertaining to specifications of several types of vehicles are stored in memory beforehand. Consequently, a highly-accurate predicted path can be effected by means of selection of optimal data through use of the selection operation means, which is easier than selection by means of direct input of individual data sets.

Preferably, information concerning one or more of a wheeltread of the vehicle, a wheelbase of the vehicle, the amount of kingpin offset, and a height at which the camera is to be mounted is stored in the memory as the data.

According to the present invention, data pertaining to one or more of a wheeltread of the vehicle, a wheelbase of the vehicle, the amount of kingpin offset, and a height at which the camera is to be mounted are stored in the memory. The distance between the treads of tires disposed at respective ends of an axle shaft can be determined from the wheeltread. Further, the distance between the center lines of the front and rear wheels can be determined from the wheelbase. These distances facilitate computation and prediction of a path on the basis of the steering angle. Since the height at which a camera is to be mounted is also given as data, the manner in which the predicted travel curve computed within the ground surface appears within the image captured by the camera can be readily computed from the relationship between the state of the ground surface captured by the camera and the shooting direction of the camera. Since required data can be selected from the data stored in the memory, the required data can be acquired by means of the driver performing only a selecting operation. Effective driving support can be effected without involvement of efforts for entering data to compensate for a difference in specifications between the vehicles.

Since the data pertaining to a vehicle comprise one or more of a wheeltread, a wheelbase, and the amount of kingpin offset, a minor difference of specifications of a vehicle can be compensated for. Hence, the data stored in the memory can be made sharable between vehicles of various types. There can be prevented exhaustion of available memory space, which would otherwise be caused by storage of duplicate data.

The present invention also provides a vehicle driving support system which captures an image of the surroundings of a vehicle through use of a camera and displays on display means driving support information along with the captured image, the system comprising:

a steering angle sensor for detecting a steering angle of a vehicle;

travel prediction means which predicts a travel path of the vehicle on the basis of a steering angle detected by the steering angle sensor and computes the thus-predicted travel path as a predicted travel curve;

memory in which there are stored beforehand data pertaining to the space which would be occupied when a vehicle travels along a predicted travel curve computed by the travel prediction means; and control means which computes, as driving support information, a path pertaining to a space by which the vehicle is predicted to pass in accordance with travel of the vehicle on the basis of the predicted travel curve predicted by the travel prediction means and through use of the data selected by means of an input operation of the selection operation means, and which causes the display means to display the computed path, wherein the control means causes the display means to display the path and does not cause the display means to display the path when the speed of the vehicle becomes greater than a predetermined speed.

According to the present invention, since a predicted path is displayed on display means, a path which changes in accordance with a steering angle can be displayed in an easily-readable manner. Further, when the speed of the vehicle becomes greater than a predetermined speed, the path is not displayed. Thus, the driver can concentrate his use of the sense of sight on only driving.

The present invention also provides a vehicle driving support system which captures an image of the surroundings of a vehicle through use of a camera and displays on display means driving support information along with the captured image, the system comprising:

a steering angle sensor for detecting a steering angle of a vehicle;

travel prediction means which predicts a travel path of the vehicle on the basis of a steering angle detected by the steering angle sensor and computes the thus-predicted travel path as a predicted travel curve;

memory in which there are stored beforehand data pertaining to the space which would be occupied when a vehicle travels along a predicted travel curve computed by the travel prediction means; and control means which computes, as driving support information, a path pertaining to a space by which the vehicle is predicted to pass in accordance with travel of the vehicle on the basis of the predicted travel curve predicted by the travel prediction means and through use of the data selected by means of an input operation of the selection operation means, and which causes the display means to display the computed path, wherein the control means causes the display means to display guidelines representing extensions of sides of the vehicle and does not cause the display means to display the guidelines when the speed of the vehicle becomes greater than a predetermined speed.

According to the present invention, guidelines are displayed for supporting driving of a vehicle. When the speed of the vehicle exceeds a predetermined speed, switching is made to prevent display of guidelines. When the vehicle speed exceeds a predetermined speed, the driver can easily ascertain the path without display of guidelines.

Preferably, the control means makes the predetermined speed match a speed limit imposed on vehicle-mounted equipment.

According to the present invention, the speed at or above which guidelines or a predicted path is not displayed is determined so as to match a speed limit imposed on on-vehicle equipment. Consequently, effective driving support can be effected in association with the state of use of the on-vehicle equipment.

The present invention also provides a vehicle driving support system which captures an image of the surroundings of a vehicle through use of a camera and displays on display means driving support information along with the captured image, the system comprising:

a steering angle sensor for detecting a steering angle of a vehicle;

travel prediction means which predicts a travel path of the vehicle on the basis of a steering angle detected by the steering angle sensor and computes the thus-predicted travel path as a predicted travel curve;

memory in which there are stored beforehand data pertaining to the space which would be occupied when a vehicle travels along a predicted travel curve computed by the travel prediction means; and control means which computes, as driving support information, a path pertaining to a space by which the vehicle is predicted to pass in accordance with travel of the vehicle on the basis of the predicted travel curve predicted by the travel prediction means and through use of the data selected by means of an input operation of the selection operation means, and which causes the display means to display the computed path, wherein the control means changes the length or color of a path to be displayed, in accordance with the speed of the vehicle.

According to the present invention, the length or color of a predicted path to be displayed is changed whether the vehicle drives at a speed slower than a predetermined speed or is stationary. Therefore, driving support can be effected so as to match a vehicle speed while displaying whether the vehicle is driving or stationary.

Preferably, the control means changes the length or color of the path stepwise in accordance with the vehicle speed.

According to the present invention, the length or color of a predicted path is changed stepwise in accordance with the speed of the vehicle. Therefore, safety can be improved in accordance with the speed of the vehicle.

The present invention also provides a vehicle driving support system which captures an image of the surroundings of a vehicle through use of a camera and displays on display means driving support information along with the captured image, the system comprising:

a steering angle sensor for detecting a steering angle of a vehicle;

travel prediction means which predicts a travel path of the vehicle on the basis of a steering angle detected by the steering angle sensor and computes the thus-predicted travel path as a predicted travel curve;

memory in which there are stored beforehand data pertaining to the space which would be occupied when a vehicle travels along a predicted travel curve computed by the travel prediction means;

obstacle detection means for detecting an obstacle which is present in the travel direction of the vehicle; and control means which computes, as driving support information, a path pertaining to a space by which the vehicle is predicted to pass in accordance with travel of the vehicle on the basis of the predicted travel curve predicted by the travel prediction means and through use of the data selected by means of an input operation of the selection operation means, and which causes the display means to display the computed path, wherein the control means changes the length or color of the path, in accordance with the result of detection performed by the obstacle detection means.

According to the present invention, since the length or color of the path is changed in accordance with the result of obstacle detection performed by the obstacle detection means, the driver can readily ascertain the presence of an obstacle and acquire information about the distance to the obstacle. Thus, effective driving support can be provided for avoiding the obstacle.

Preferably, the obstacle detection means outputs one of predetermined detection signal of several stages in accordance with the distance to the detected obstacle, and the control means changes the length or color of the path in stages in accordance with a detection signal output from the obstacle detection means.

According to the present invention, since the length or color of a predicted path can be changed in accordance with the distance to an obstacle, driving support pertaining to an approach to an obstacle can be provided in an easily-understandable manner.

The present invention also provides a vehicle steering angle detector for detecting a steering angle of a vehicle from an exposed portion of a steering shaft which rotates in response to the actuation of a steering wheel, the exposed portion being located within a vehicle body, the detector comprising:

a steering angle sensor which detects the amount of angular displacement of the steering shaft at the exposed portion of the steering shaft; and a bracket whose base end is secured to the vehicle body in the vicinity of the exposed portion of the steering shaft, by means of utilization of screws to be used for fixing bearings of the steering shaft to the vehicle body, and which has a geometry satisfying requirements for the vicinity of the steering shaft of the vehicle so that the steering angle sensor can be attached to the front end of the bracket.

According to the present invention, the steering angle of a vehicle can be detected through use of an exposed portion of a steering shaft which rotates in response to actuation of a steering wheel, the exposed portion being located within a vehicle body. A steering angle sensor is attached to the vicinity of the exposed portion of the steering shaft through use of a bracket and by means of utilization of screws to be used for mounting bearings of the steering shaft to the vehicle body. The bracket has a geometry satisfying requirements for the vicinity of the steering shaft of the vehicle such that the base end of the bracket is mounted on the vehicle body and such that the steering angle sensor is attached to the front end of the bracket. Accordingly, the rotation of the steering shaft is accurately detected without fail, and the steering angle to be used for predicting the path of a vehicle can be readily detected.

Preferably, the vehicle steering angle detector further comprises a splittable shaft gear to be fitted around the exposed portion of the steering shaft; and a detection gear which is rotatably supported by the bracket and meshes with the shaft gear and whose rotation is detected by the steering angle sensor.

According to the present invention, a splittable shaft gear is fitted around the exposed portion of the steering shaft, and a detection gear which meshes with the shaft gear is rotatably supported. The rotation of the detection gear is detected by the steering angle sensor, and hence the rotation of the steering shaft can be detected without fail. The thus-detected rotation can be utilized for predicting the path of the vehicle.

DETAILED DESCRIPTION OF PREFERRED EMBODIMENTS

Figure 1:
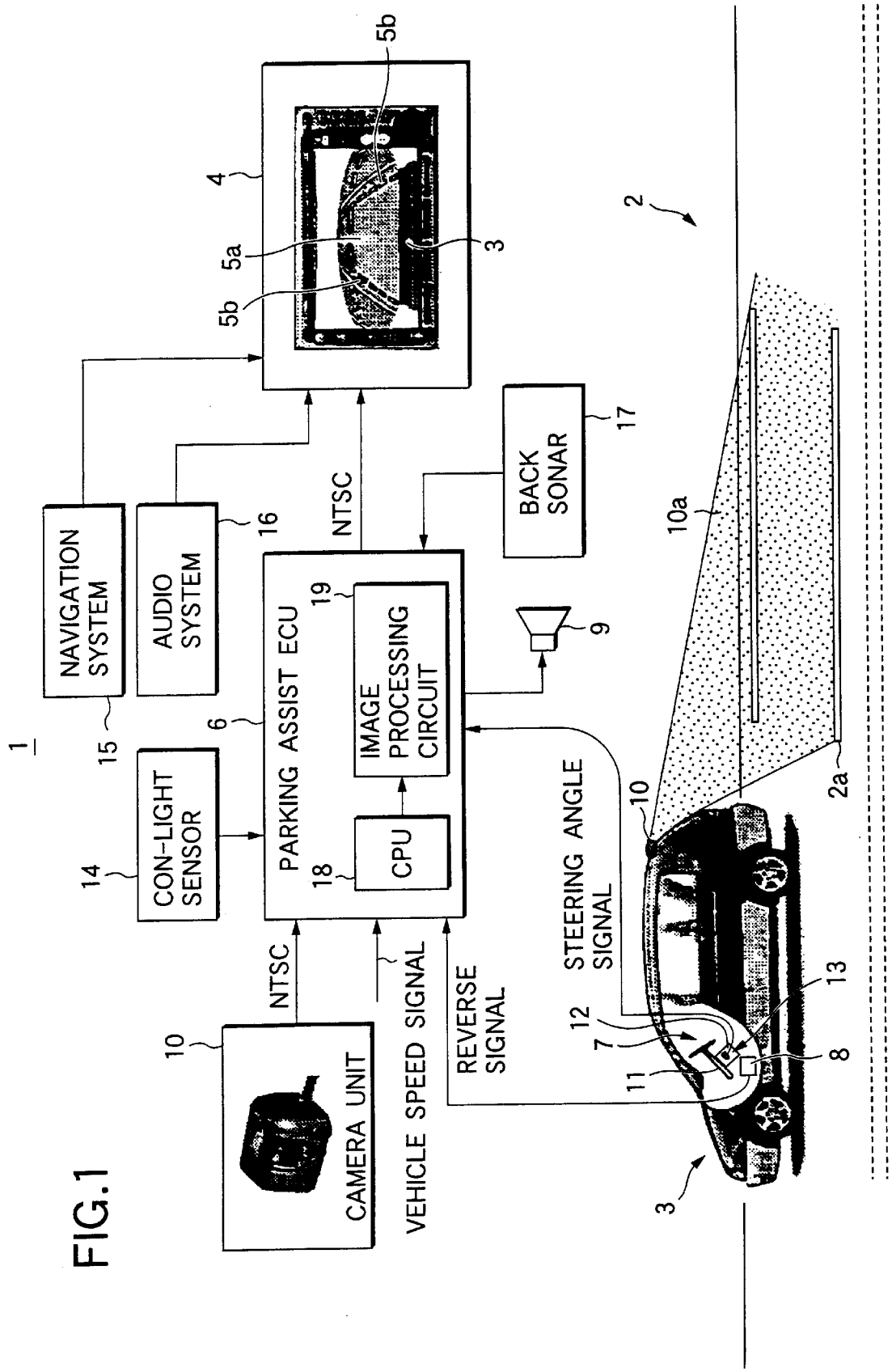
FIG. 1 is a block diagram showing the schematic configuration of a parking assist system 1, which is an embodiment of a driving support system according to the present invention.

FIG. 1 schematically shows the configuration of a parking assist system, which is an embodiment of a driving support system according to one embodiment of the present invention. When a vehicle 3 drives and attempts to park along a white line 2a of a parking lot 2, an image is displayed on an information display 4 serving as display means, thereby supporting the driving operation of the vehicle 3. On the display screen of the information display 4, a predicted path 5a of the vehicle 3 and guidelines 5b, which are extensions of the vehicle body, are displayed together with an image of the parking lot 2. Parking operation of the driver of the vehicle 3 is supported on the basis of a rearview appearing on the information display 4, the predicted path 5a, and the guidelines 5b.

Driving support information appearing on the information display 4 is prepared by a parking assist ECU 6 which is one a plurality of electronic control units (hereinafter abbreviated "ECUs") provided in the vehicle 3. A signal representing the result of operation of a steering wheel 7 or a transmission 8 of the vehicle 4 is input to the parking assist ECU 6. The parking assist ECU 6 sends a warning or effects voice guidance by way of a speaker 9.

A camera unit 10 captures an image of the parking lot 2 to be displayed on the information display 4. The camera unit 10 is mounted on an elevated location at the rear end of the vehicle 3. A view field 10a of the camera unit 10 is directed toward the parking lot 2. The camera unit 10 outputs a video signal of the NTSC system, and the thus-output video signal is input to the parking assist ECU 6. The parking assist ECU 6 effects image processing such that the predicted path 5a and the guidelines 5b are superimposed on the image captured by the camera unit 10. The thus-processed image is output to the information display 4 as a video signal of the NTSC system.

The predicted path 5a is changed in accordance with the angle of a steering shaft 11 and in response to operation of the steering wheel 7. In order to detect a steering angle from the steering shaft 11, a steering angle detector 12 is disposed in the vicinity of a portion of the steering shaft 11 exposed outside the vehicle body. A steering angle sensor 13 is provided in the steering angle detector 12, and a signal representing the result of detection of a steering angle is input to the parking assist ECU 6. On the basis of the steering angle detected by the steering angle sensor 13, the parking assist ECU 6 calculates a predicted travel curve of the vehicle 3. On the basis of a wheelbase (i.e., the distance between the centers of the front and rear axle shafts), a wheel tread (i.e., the distance between the treads of tires provided on respective ends of an axle shaft), and/or the amount of kingpin offset, there is computed a predicted path 5a representing a space, which space would occupy when the vehicle travels along a predicted travel curve.

The manner in which the predicted path 5a is read on the display screen of the information display 4 varies with the position at which the camera unit 10 is mounted. The parking assist ECU 6 displays the predicted path 5a on the information display 4 through use of the position at which the camera 10 is mounted. Information about the position where the camera unit 10 is mounted is also utilized when the guidelines 5b showing the extensions of the sides of the vehicle body are displayed on the information display 4. The direction of the guidelines 5b is fixed with respect to the view field 10a of the camera unit 10. Therefore, the direction of the guidelines 5b is changed in accordance with the position at which the camera unit 10 is mounted.

The screen of the information display 4 is adjusted in accordance with the brightness of surroundings. The brightness of surroundings is detected by a con-light sensor 14 used for controlling an illuminating state of an illumination system of the vehicle 3 and is controlled on the basis of an output from the con-light sensor 14. The brightness and contrast of the illumination system are adjusted in accordance with the brightness of surroundings of the vehicle 3 detected by the con-light sensor 14, thereby effecting readily-comprehensible driving support.

In-car equipment, such as a navigation system 15 and audio equipment 16, is provided in the vehicle 3. A limitation is imposed on the operating speed of the navigation system 15 associated with driving of a vehicle, in accordance with the traveling speed of the vehicle 3. Provided that, for instance, 10 km/h is taken as a reference speed, the navigation system 15 is provided with the function of operating at only a speed lower than 10 km/h.

When the vehicle 3 travels backward, detection of obstacles on a road surface can be made through use of a back sonar 17. The back sonar 17 serving as obstacle detection means detects obstacles through use of ultrasonic waves. The parking assist ECU according to the present embodiment changes the displaying state of a display appearing on the information display 4, by means of utilization of an output from the back sonar 17.

The parking assist ECU 6 includes a CPU 18 for controlling the entire parking assist ECU 6 and an image processing circuit 19 which effects image processing for displaying an image on the information display 4. A signal indicating the speed of the vehicle 3 and a signal indicating a changed state of the transmission 8 enter the CPU 18, along with a signal output from the con-light sensor 14 and a signal output from the back sonar 17. On the basis of these signals, the CPU 18 can control the image processing circuit 19, to thereby change the state of an image appearing on the information display 4.

Figure 2:
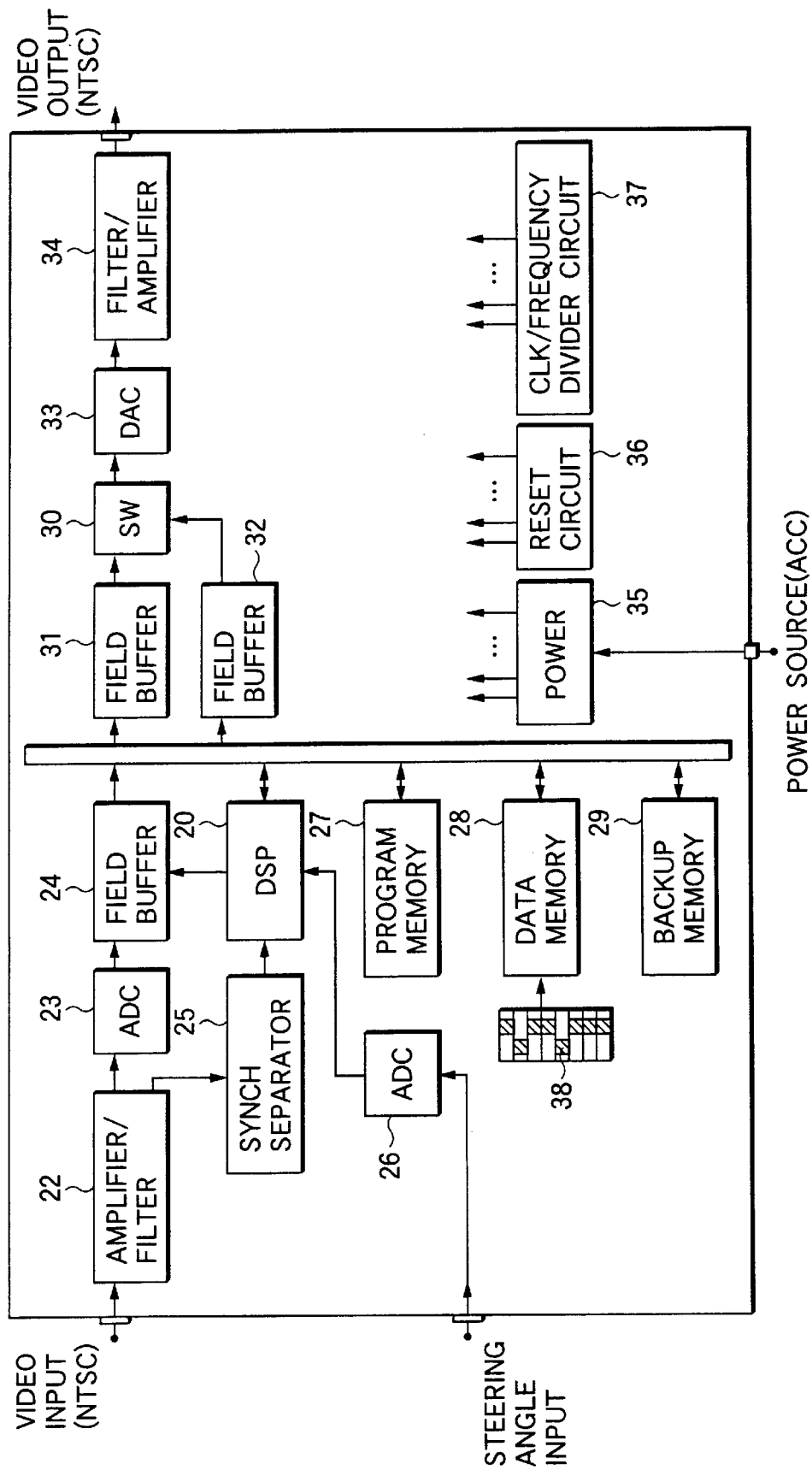
FIG. 2 is a block diagram schematically showing the electrical configuration of an image processing circuit 19 provided in a parking assist ECU 6 shown in FIG. 1.

FIG. 2 shows the electrical configuration of the image processing circuit 19 included in the parking assist ECU 6 shown in FIG. 1. Image processing operations performed in the image processing circuit 19 are performed by a digital signal processor (hereinafter abbreviated "DSP"). An image captured by the camera unit 10 is input to an amplifier/filter circuit 22 in the form of an NTSC signal. The thus-input image is an analog signal, and hence an analog-to-digital converter (hereinafter abbreviated as "ADC") 23 converts the analog signal into a digital signal. The thus-converted digital signal is stored in a field buffer circuit 24. An image signal output from the amplifier/filter circuit 22 is also delivered to a synch separation circuit 25, in which a horizontal synch signal and a vertical synch signal are separated from the image signal. The thus-separated synch signals are input to the DSP 20.

A steering angle detection signal output from the steering angle sensor 13 is also input to the DSP 20 by way of the ADC 26. In accordance with a program which has been stored in program memory 27 beforehand, the DSP 20 performs image processing. At the time of image processing, there are produced an image to be used for displaying the predicted path 5a and an image to be used for displaying the guidelines 5b, such as those shown in FIG. 1. These images are formed from the data previously stored in data memory 28, by means of computation. In the data memory 28 there are previously stored data pertaining to many types of vehicles. In connection with each type of vehicle, data comprise the width of a vehicle, a wheeltread representing the distance between the treads of tires provided at both ends of the axle shaft, a wheelbase indicating the distance between the center lines of the front and rear axle shafts, the amount of kingpin offset, and the position on a vehicle body in which the camera unit 10 is to be mounted. Not all these pieces of information are necessary. However, if all these pieces of information are available, the accuracy of prediction of a path can be improved. Since contents stored in backup memory 29 are preserved by means of a battery, data required to be backed up, such as data or parameters to be used when the DSP 20 performs image processing, can be stored.

An image produced as a result of image processing performed by the DSP 20 is stored in two field buffer circuits 31 and 32, in which selection between image signals output from the field buffer circuits 31 and 32 can be made by a switch (hereinafter abbreviated as "SW") circuit 30. The image signal selected by the SW circuit 30 is converted into an analog signal by means of a digital-to-analog converter (hereinafter abbreviated as "DAC") circuit 33. The analog signal output from the DAC circuit 33 is delivered to the information display 4 as a video output signal, by way of a filter/amplifier circuit 34. The power required for activating the entire image processing circuit 19 is supplied from a power source 35. When the power source 35 is turned on, a reset signal is supplied from a reset circuit 36. The DSP 20 performs an operation in synchronism with a clock signal supplied from a CLK/frequency-divider circuit 37 or a signal produced by means of division of the clock signal.

Selection between the data stored in the data memory 28 in accordance with the type of a vehicle to be used is made by means of switching action of a DIP switch 38 serving as selection operation means. The data memory 28 is formed from electrically-rewritable non-volatile memory; for example, flash memory. Data are prepared beforehand for each of the required specifications of vehicles on which the parking assist system 1 can be mounted. The thus-prepared data are stored in the data memory 28. The relationship between settings of the DIP switch 38 and use of the DIP switch 38 is prepared by the person who prepares the data. Settings of the DIP switch 38 are made in a service workshop or the like after the user of the parking assist system 1 has determined the type of vehicle 3. Jumper switches may be used in lieu of the DIP switch 38.

Figure 3:
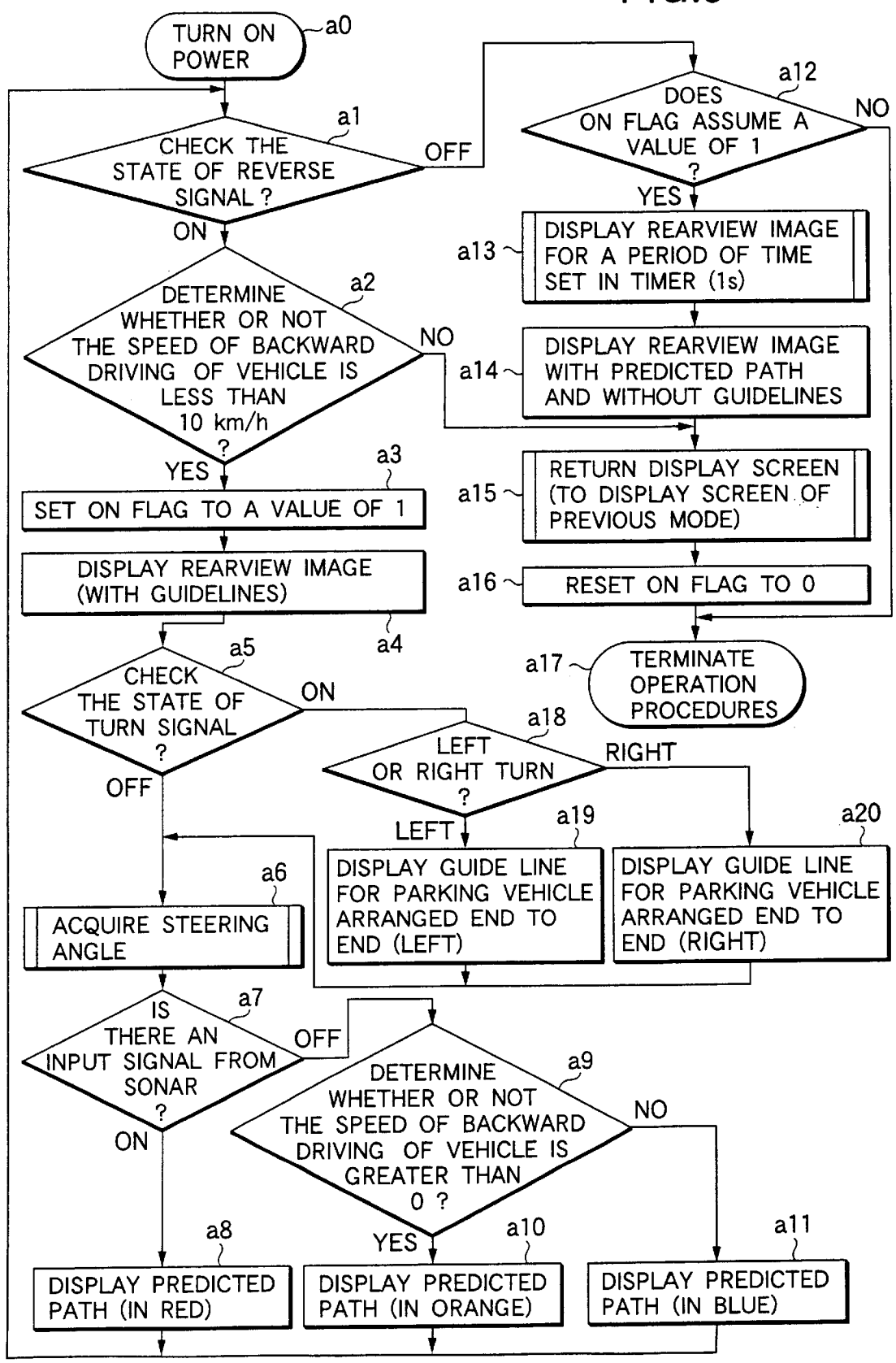
FIG. 3 is a flowchart showing control procedures to be performed by the parking assist ECU 6 shown in FIG. 1.

FIG. 3 shows the outline of control procedures to be performed by the parking assist ECU 6 according to the embodiment shown in FIG. 1. Power of the parking assist ECU 6 is turned on in step a0, wherewith the parking assist ECU 6 commences an operation. In step a1, a determination is made as to the state of a reverse signal; that is, whether or not the transmission 8 is brought in a reverse mode. If the reverse signal is in an ON state, in step a2 a determination is made as to whether or not the speed of backward driving of the vehicle 3 is lower than 10 km/h. When the speed of backward driving is determined to be under 10 km/h, in step a3 an ON flag provided in internal memory of the parking assist ECU 6 is set to a value of 1. In step a4 a rearview image captured by the camera unit 10 is displayed on the information display 4. At this time, the guidelines 5b are also displayed.

Figure 4:
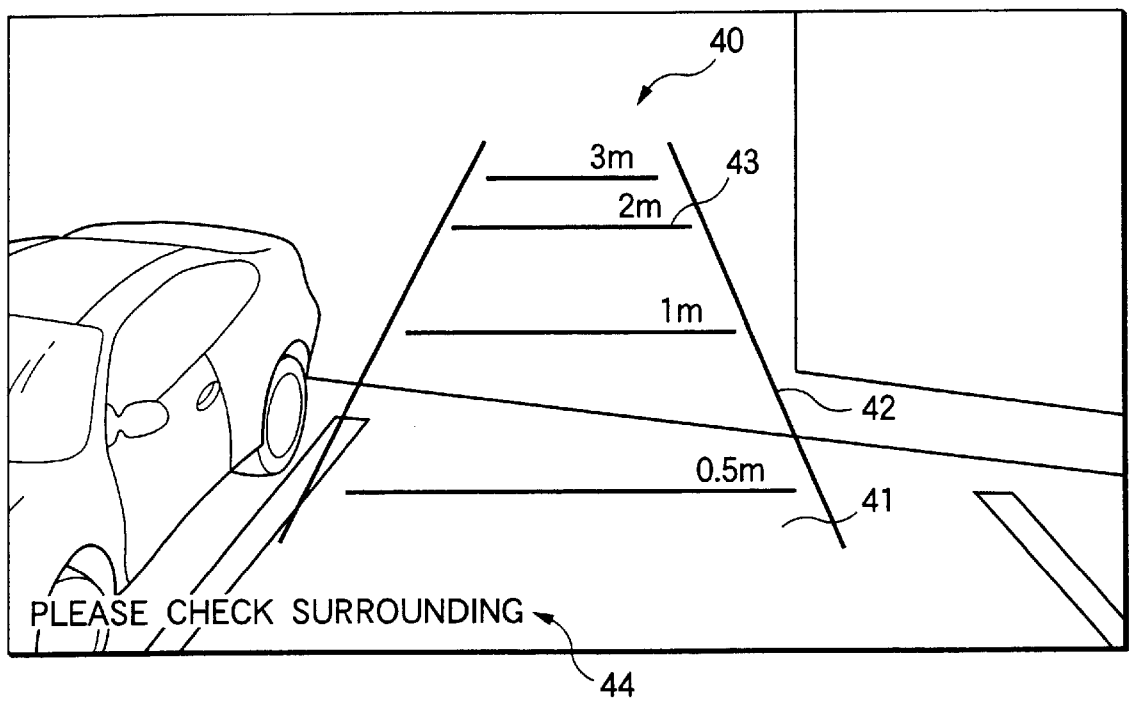
FIG. 4 is an illustration showing an example video displayed on an information display 4 shown in FIG. 1.
Figure 5:
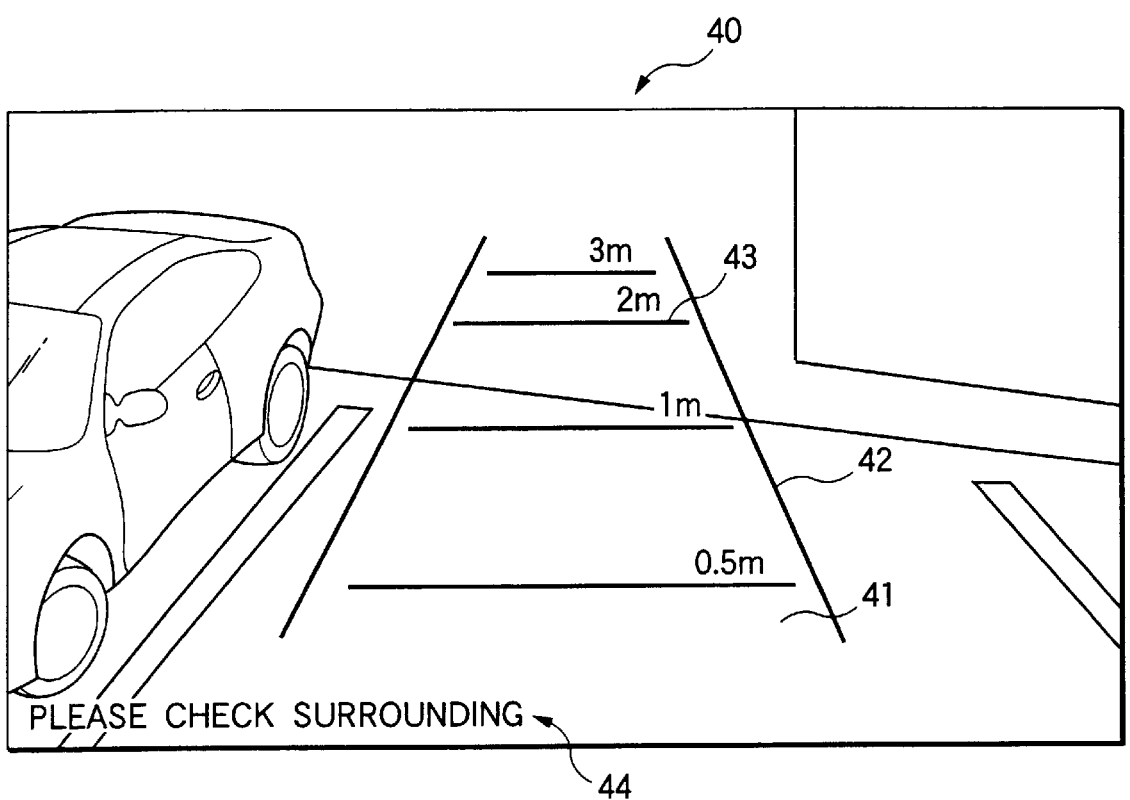
FIG. 5 is an illustration showing another example video displayed on the information display 4 shown in FIG. 1.
Figure 6:
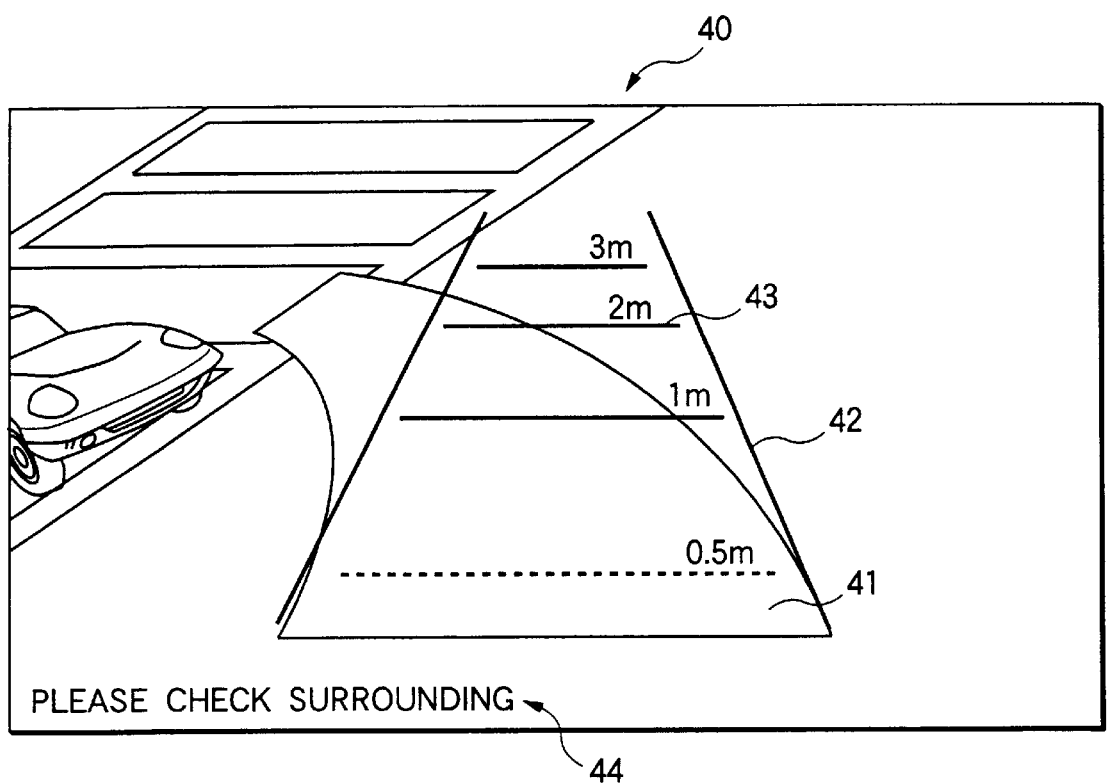
FIG. 6 is an illustration showing still another example video displayed on the information display 4 shown in FIG. 1.

In step a5 a determination is made as to the state of a turn signal. If the turn signal is in an OFF state, in step a6 a steering angle is detected on the basis of a signal output from the steering angle sensor 13. In step a7 a determination is made as to whether or not there is an input from the back sonar 17. Upon detection of an obstacle located within a predetermined distance from the vehicle, the back sonar 17 reports the presence of an obstacle by means of emitting a continuous beep sound. If the beep sound is detected, in step a8 a first predicted path is displayed, as shown in FIG. 4. If in step a7 the back sonar 17 has not detected any obstacles within the predetermined range of distance, no continuous beep sound is emitted. Processing then proceeds to step a9, where a determination is made as to whether or not the speed of backward driving of the vehicle 3 is greater than 0 or whether the vehicle 3 is driving or stationary. If the vehicle is not stationary, in step a10 a second predicted path is displayed, as shown in FIG. 5. In step a9 the vehicle 3 is determined to be stationary, a third predicted path shown in FIG. 6 is displayed. Processing returns to step a1 after completion of processing pertaining to step a8, a10, or a11.

If the reverse signal is determined to be in an OFF state in step a1, processing proceeds to step a12, where a determination is made as to whether or not the ON flag assumes a value of 1. If the ON flag assumes a value of 1, an internal timer of the parking assist ECU 6 is set to a predetermined period of time; for example, one second. In step a14 a rearview image captured by the camera unit 10 is displayed on the information display 4. In this case, however, the predicted path 5a is displayed on the information display 4, but the guidelines 5b are not displayed. The rearview image is displayed only for a period of time set in the timer in step a13. After lapse of the period of time set in the timer, or, if in step a2 the speed of backward driving is determined to be 10 km/h or more, in step a15 the display screen on the information display 4 is returned a display screen which has been displayed before driving support information is displayed; for example, a route guidance screen of the navigation system 15. In step a16 the ON flag is reset to 0. After termination of processing pertaining to step a16 or when it is determined that the ON flag is not set to a value of 1, operation procedures are terminated in step a17.

In the present embodiment, in step a5 the status of a turn signal is determined. If the turn signal is determined to be in an ON state, in step a18 a determination is made as to whether either a left-turn signal or a right-turn signal is in an ON state. If the left-turn signal is determined to be in an ON state, in step a19 there are displayed guidelines 5b to be used when a vehicle is to be parked between vehicles arranged end to end and on the left side of the road. In step a18 if the right-turn signal is determined to be in an ON state, in step 20 there are displayed guidelines 5b to be used when a vehicle is to be parked between the vehicles arranged end to end and on the left side of the road. These guidelines for end-to-end parking can be displayed in accordance with a program stored in the program memory 27 shown in FIG. 2 and the data stored in the data memory 28.

FIG. 4 shows the first predicted path displayed in step a8 shown in FIG. 3. An image 40 displayed on a display screen of the information display 4 is formed by means of superimposing a predicted path 41 and guidelines 42 on the image captured by the camera unit 10. The guidelines 42 are displayed along with a range scale 43. A caution 44 is also included in a part of the image 40 for prompting direct visual check. FIG. 5 shows the second predicted path displayed in step a10 shown in FIG. 3. FIG. 6 shows the third predicted path displayed in step a11 shown in FIG. 3.

The predicted path 41 included in each of the images 40 shown in FIGS. 4, 5, and 6 is changed in length and color. On the basis of data pertaining to a steering angle and a vehicle, the predicted path 41 is redrawn at all times. The right and left side lines of the vehicle and a range of area extending over 5 meters from the rear end of the vehicle are displayed. Since FIG. 4 shows no obstacles located near the vehicle, the predicted path 41 is displayed in red so as to extend to a range of, for example, about 0.5 meters. Since the vehicle 3 shown in FIG. 6 is stationary, the predicted path 41 is displayed in, for example, a light blue so as to extend to a range of 5 meters. The vehicle shown in FIG. 5 is in an intermediate state between the state shown in FIG. 4 and the state shown in FIG. 6. The predicted path 41 is displayed in, for example, orange and so extend to an intermediate range of about 2 meters.

The guidelines 42 shown in FIGS. 4 to 6 are displayed symmetrically while being fixed in the center of the information display 4. The area from a position 0.5 meters from the rear end of the vehicle to a position 5 meters from the same is displayed in the form of the guidelines 42. The range scale 43 indicating distance is displayed in conjunction with the guidelines 42. A wide-angle lens is used for the camera unit 10 in order to enable the driver to check obstacles within a range covering rear blind spots of the vehicle along with the display of the predicted path 41 and the guidelines 42.

Figure 7:
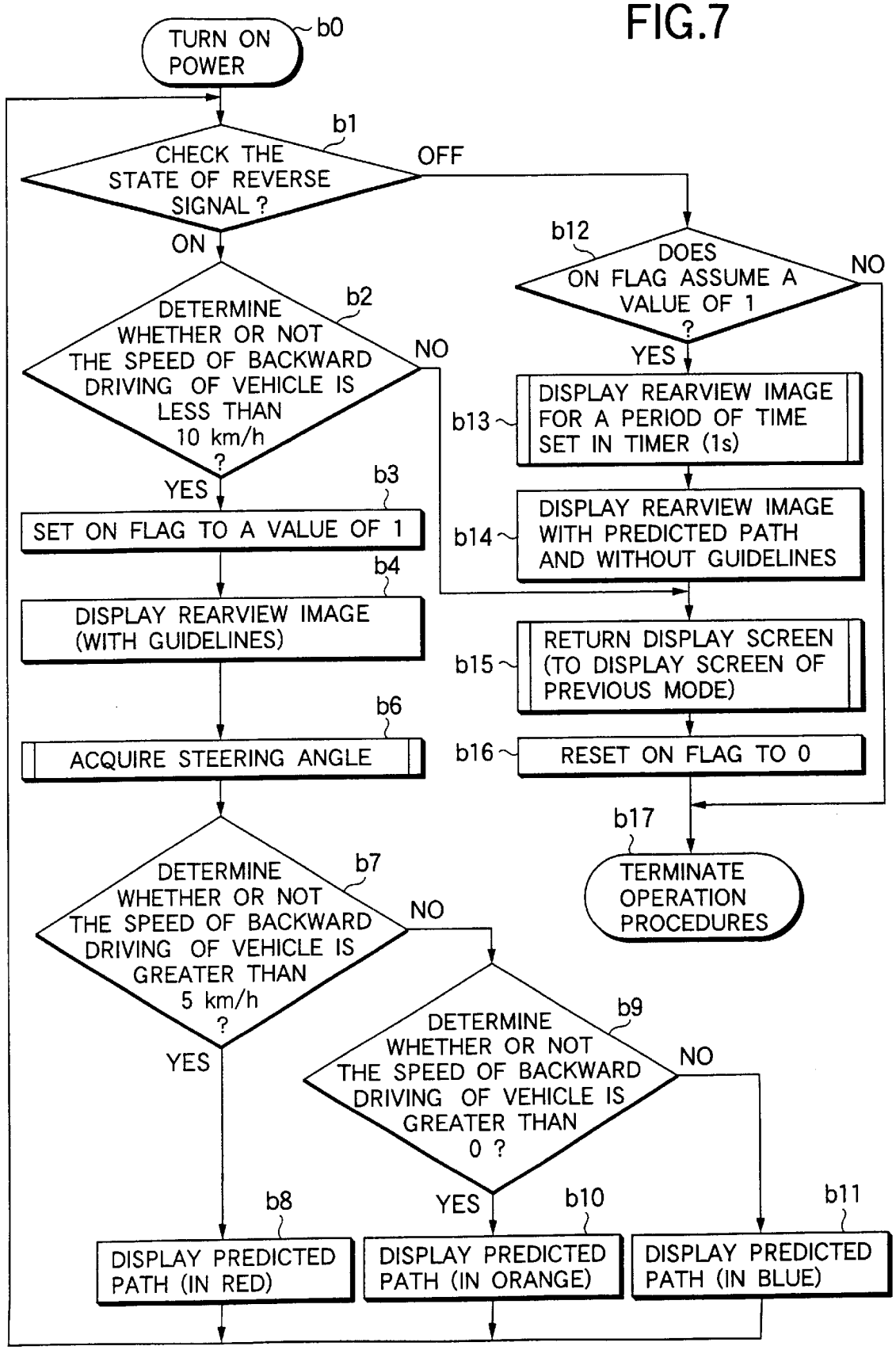
FIG. 7 is a flowchart showing control procedures to be performed by the parking assist ECU 6 shown in FIG. 1 according to another embodiment of the present invention.

FIG. 7 shows control procedures according to another embodiment for changing the length and color of the predicted path 41, which is shown in FIGS. 4, 5, and 6, in accordance with only a speed. In the present embodiment, processing pertaining to steps a5 and a18 to a20 is not performed. In the present embodiment, processing pertaining to steps b0 to b4 and processing pertaining to steps b6, b8, and b10 to b17 are equal to processing pertaining to steps a0 to a4, a6, a8, and a10 to a17 shown in FIG. 3. In the present embodiment, after a steering angle has been detected in step b6, in step b7 a determination is made as to whether or not the vehicle speed of the vehicle exceeds the speed of a second stage; for example, a speed of 5 km/h. If the speed is determined to exceed a speed of 5 km/h, the predicted path 41 of first stage is displayed in step b8. If in step b7 the speed is determined to not exceed 5 km/h, in step b9 a determination is made as to whether or not the speed is greater than 0; that is, whether the speed is greater than 0 and lower than 5 km/h. If it is determined that the vehicle is not stationary, in step b10 the second predicted path is displayed. In contrast, if it is determined that the vehicle is stationary, in step b11 the third predicted path is displayed.

Figure 8:
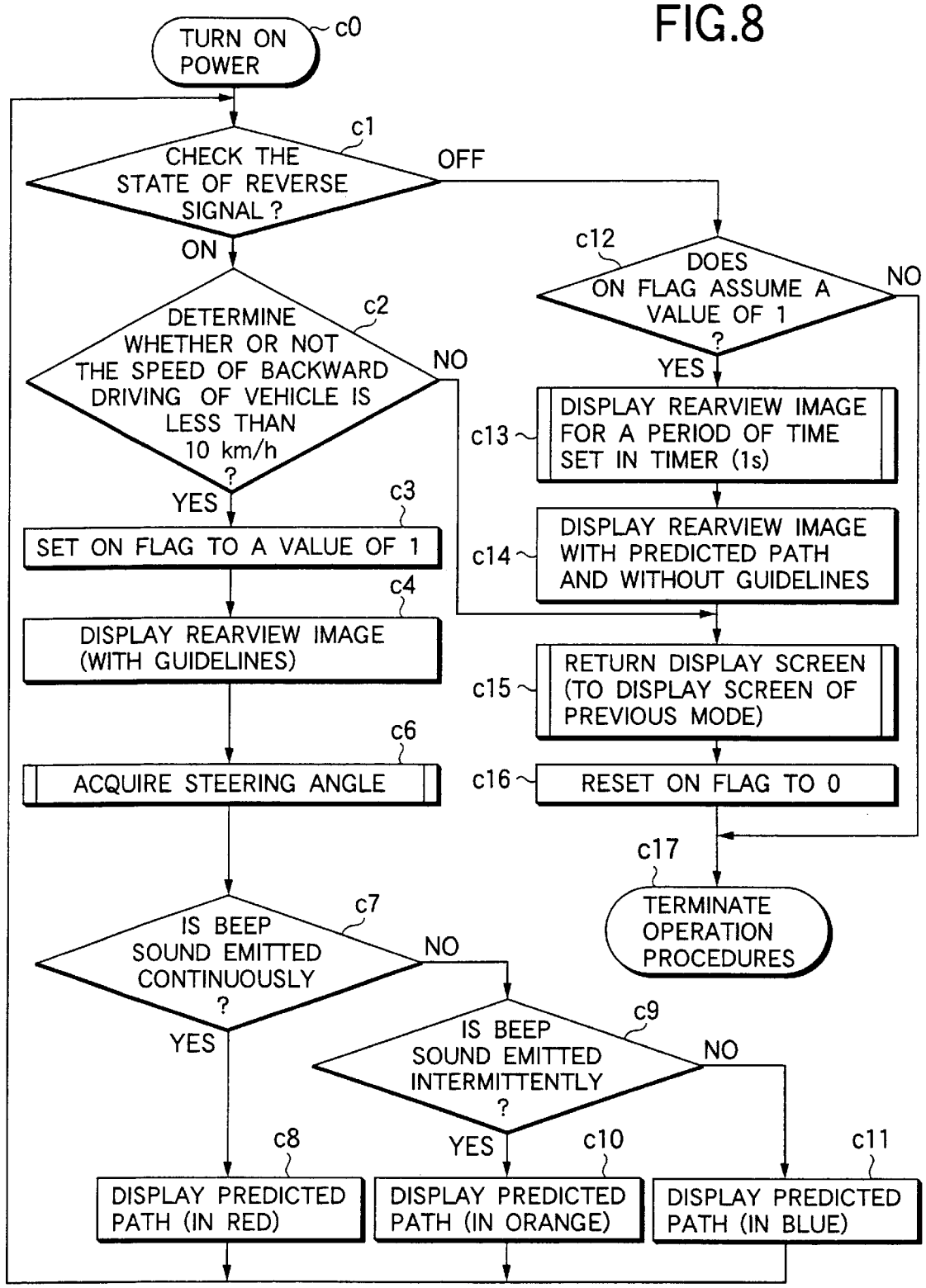
FIG. 8 is a flowchart showing control procedures to be performed by the parking assist ECU 6 shown in FIG. 1 according to yet another embodiment of the present invention.

FIG. 8 shows control procedures according to still another embodiment, wherein a warning is changed in accordance with the distance to an obstacle, by means of combination of emission of continuous beep sound and intermittent beep sound after the back sonar 17 has detected the obstacle. When the distance to an obstacle becomes less than a predetermined value, the back sonar 17 emits a continuous beep sound. In contrast, if a distance is greater than a predetermined value, the back sonar 17 emits an intermittent beep sound. In the present embodiment, the display shown in FIG. 4 and the display FIG. 5 are made to correspond to each other. In the event that no obstacles are detected, a display such as that shown in FIG. 6 is displayed. A change in the display reflects on only the back sonar 17. The present embodiment is analogous to that shown in FIG. 7, except that in steps c7 and c9 shown in FIG. 8 the mode of display of a predicted travel path is changed in accordance with a change in the signal output from the back sonar 17. Processing pertaining to steps c0 to c6, c8, and c10 to c17 is equal to that pertaining to steps b0 to b6, b8, and b10 to b17 shown in FIG. 7.

In the embodiments which have been described above, the length and color of the predicted path 41 and those of the guidelines 42 are changed in accordance with a vehicle speed or a distance to an obstacle. Either the length or color of the predicted path 41 and either the length or color of the guidelines 42 may be changed. Alternatively, the length and color of the predicted path 41 and those of the guidelines 42 may be changed continuously with a vehicle speed or a distance to an obstacle. In any event, the driver can ascertain a change in circumstances.

Figure 9:
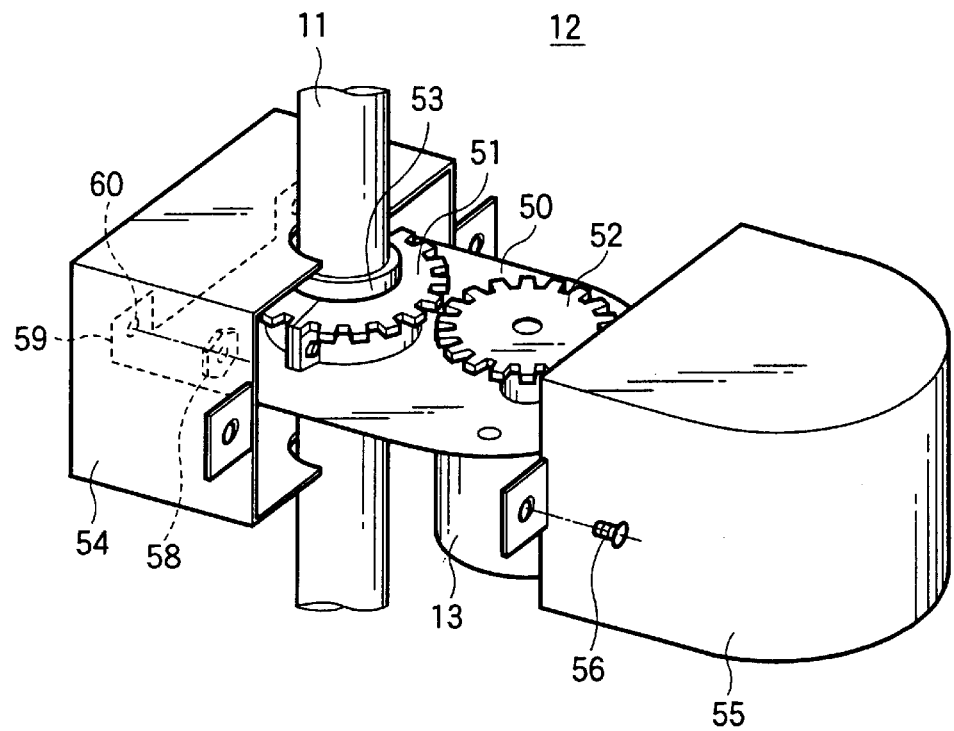
FIG. 9 is an exploded perspective view showing the structure of a steering angle detector 12 shown in FIG. 1.

FIG. 9 is an exploded view of configuration of the steering angle detector 12 shown in FIG. 1. The steering angle detector 12 is supported by a mount bracket 50 attached to the vehicle body. A shaft gear 51 is attached to the steering shaft 11. The shaft gear 51 can be separated into two pieces and can be fitted around the steering shaft 11 from the sides thereof. Angular displacement transmitted from the steering shaft 11 to the shaft gear 51 is transmitted to a detection gear 52 attached to the rotary shaft of the steering angle sensor 13. The steering angle sensor 13 is attached to the mount bracket 50 such that the detection gear 52 meshes with the shaft gear 51. The shaft gear 51 is fitted around the steering shaft 11 by way of a spacer 53, even when the outer diameter of the steering shaft 11 differs in accordance with the type of a vehicle. A change in the outer diameter of the steering shaft 11 due to a change in the type of vehicle can be accommodated by means of a change in the thickness of the spacer 53. The steering angle sensor 13 and the detection gear 52, which are attached to the mount bracket 50, and the shaft gear 51 attached to the steering shaft 11 are accommodated in the space defined by combination of unit covers 54 and 55. Unit covers 54 and 55 are fastened to the steering shaft 11, through use of fastening screws 57. The mount bracket 50 is attached to bolts projecting from the vehicle body, by means of mount nuts 58. Mount sections 59 are formed on the base end of the mount bracket 50, and mount holes 60 are formed in the respective mount sections 59 so as to permit insertion of bolts.

Figure 10:
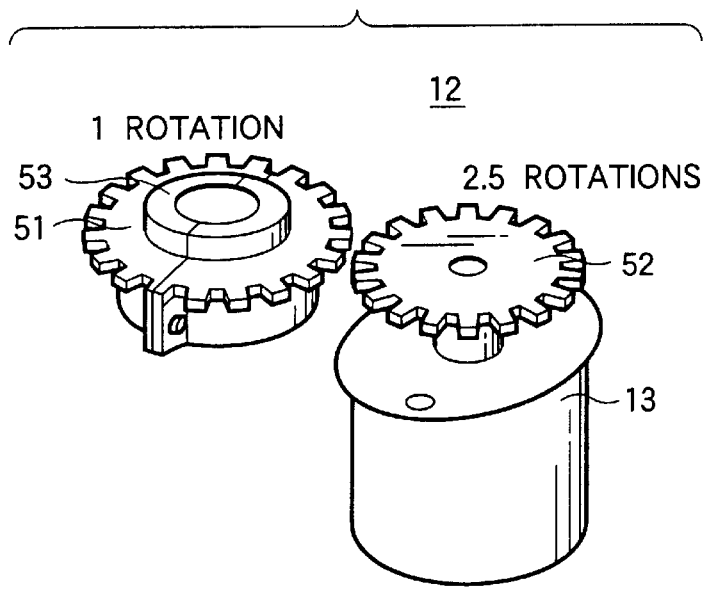
FIG. 10 is a simplified perspective view showing the configuration of the steering angle detector shown in FIG. 9.

FIG. 10 shows the structure of a steering angle detector 12 shown in FIG. 9. The shaft gear 51 is formed so as to have a greater number of teeth than the detection gear 52. While the shaft gear 51 makes one rotation, the detection gear 52 makes two and one-half rotations. The shaft gear 51 is attached to the steering shaft 11 by way of the elastic spacer 53 made of, for example, rubber. At the time of attachment of the shaft gear 51 to the steering shaft 11, the steering shaft 11 is held at a steering angle of 0°; that is, at a neutral position. The shaft gear 51 is attached to the steering shaft 11, and the steering angle sensor 13 is attached to the mount bracket 50 such that the detection gear 52 meshes with the shaft gear 51. In this state, the steering angle sensor 13 outputs a voltage corresponding to a detected steering angle. An output voltage of 0 volt indicates that the steering shaft 11 is in a neutral position. A positive signal or a negative sign indicates the direction of a steering angle. Further, the absolute value of the output voltage increases with the steering angle.

Figure 11A:
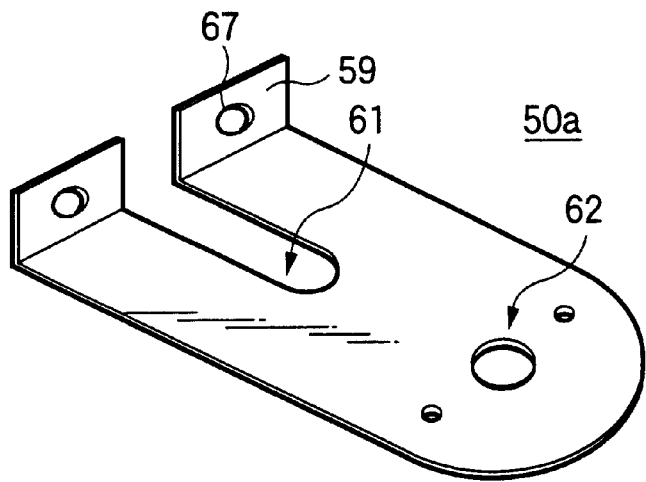
FIGS. 11A and 11B are perspective views showing the geometries of mount brackets 50 shown in FIG. 9.
Figure 11B:
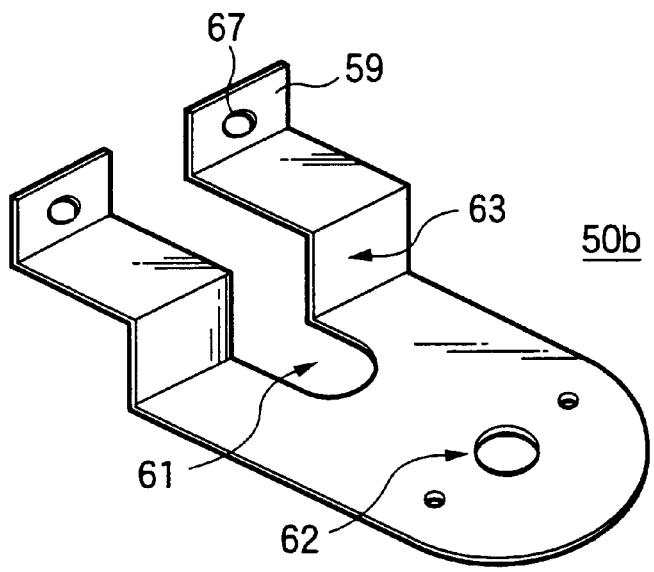

FIGS. 11A and 11B show the geometry of the mount bracket 50. The mount bracket 50 is used in the form of a mount bracket 50a shown in FIG. 11A or in the form of a mount bracket 50b shown in FIG. 11B, in accordance with the type of a vehicle of interest. The mount brackets 50a and 50b are formed from steel plates having a thickness of about 2 mm. The mount sections 59, the mount holes 60, a steering shaft insert section 61, and a steering angle sensor mount section 62 are formed in each of the steel plates by means of processing. Moreover, step sections 63 are formed in the mount bracket 50b shown in FIG. 11B.

Figure 12:
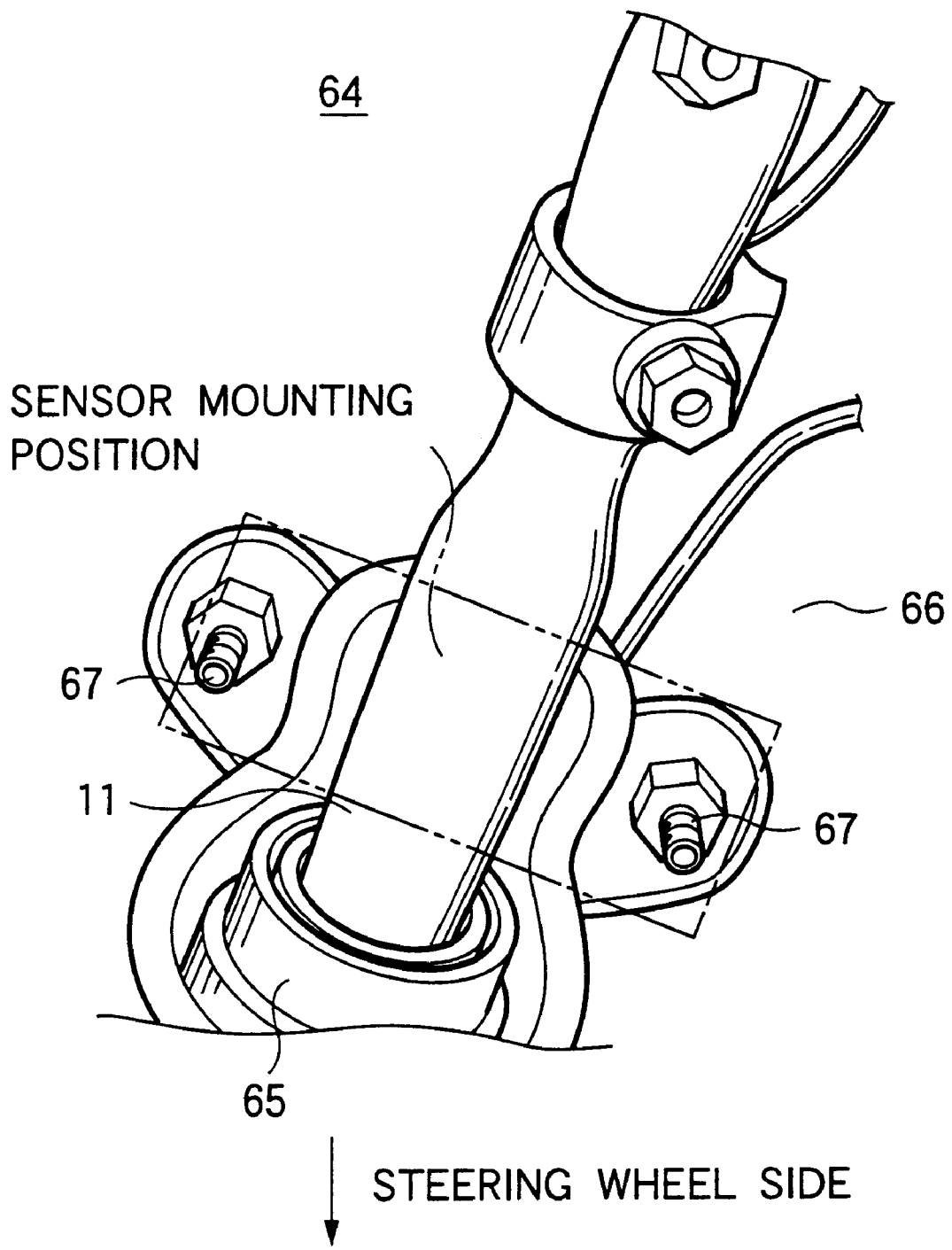
FIG. 12 is an illustration showing an example exposed section 64 at which the steering angle detector 9 shown in FIG. 9 is to be mounted.

FIG. 12 shows the structure of the vehicle body on which the mount bracket 50 is to be mounted. The mount bracket 50 is attached to the area in the vicinity of an exposed portion 64 of the steering shaft 11. The mount bracket 50 is secured to the exposed portion 64 by utilization of support bolts 67 which are to be used for mounting, on a vehicle 66, a steering column tube 65 for supporting the steering shaft 11. The mount holes 60 of the mount sections 59 are fitted to corresponding screw threads of the support bolts 67, and the mount nuts 58 shown in FIG. 9 are screwed onto the screw threads for fastening.

Figure 13A:
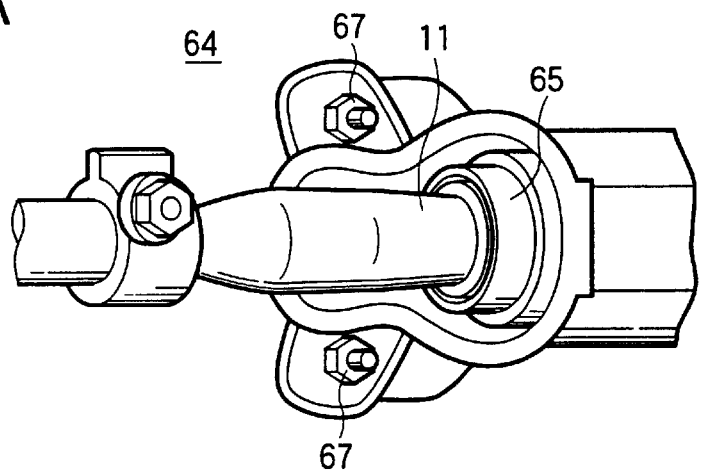
FIGS. 13A to 13C are illustrations showing a difference in the exposed portions 64 according to the type of a vehicle.
Figure 13B:
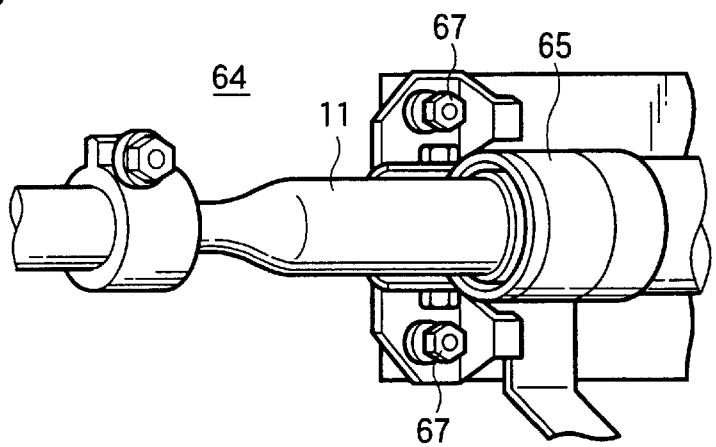
Figure 13C:
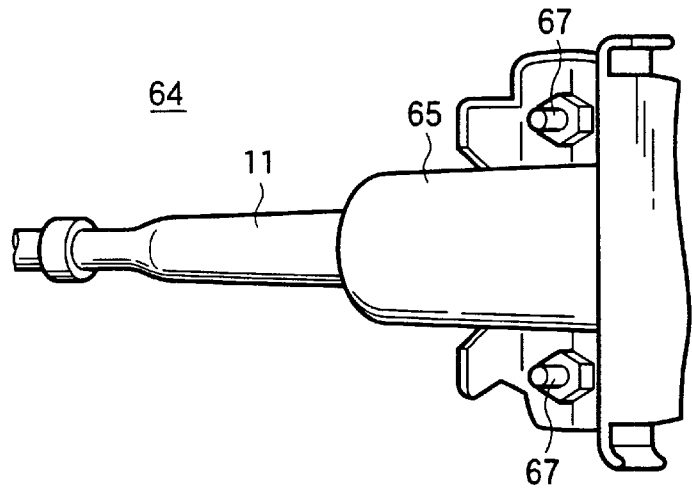

FIGS. 13A to 13C show the surroundings of the exposed section 64, which vary in accordance with the type of vehicle. As shown in FIGS. 13A and 13B, in the case of a vehicle whose steering column tube 65 is comparatively short, the mount bracket 50a shown in FIG. 11A is employed. In contrast, in the case of a vehicle whose steering column tube 65 is comparatively long, the mount bracket 50b which has the steps 63 shown in FIG. 11B is employed.

In the present embodiment, driving support is effected when the driver attempts to park his vehicle. Even in a case where the vehicle drives forward, driving support can be effected in the same manner by means of displaying a predicted path. Although the driver can look directly ahead so as to obtain the forward view of the vehicle, only an experienced driver can correctly predict a path resulting from the steering angle. If the present invention is applied to such a case, a predicted path resulting from a steering angle can be correctly displayed, thus effecting easily-understandable driving support.

As has been mentioned above, data to be stored in memory are selected beforehand, and the thus-selected data can be used for computing a path along a predicted path curve of a vehicle, which curve is to be displayed along with an image captured by a camera. Even in a case where driving support systems are mounted on vehicles of different specifications, the driving support systems of the same configuration can perform effective driving support, so long as data are stored in memory beforehand.

According to the present invention, the data to be used for computing a path comprise one or more of a wheeltread of a vehicle, a wheelbase of the vehicle, the amount of kingpin offset, and the height at which a camera is to be mounted. Even in the case of a vehicle which appears to be different in type, if the vehicle involves the same wheeltread and wheelbase, the same amount of kingpin offset, and the same height, there is no necessity for using different data. Even when there is a minor difference in specifications, data which are stored in memory as common data can be used for many types of vehicles.

According to the present invention, a predicted path of the vehicle is displayed, and there can be displayed a path which is predicted on the basis of the direction and steering angle of the current vehicle. Since the speed of a vehicle exceeds a predetermined speed, a predicted path is not displayed. Accordingly, there can be prevented diversion of attention from driving, which would otherwise be caused by a display appearing on display means. The driver can focus his attention on visual observation of the surroundings of the vehicle, thereby improving safety.

According to the present invention, guidelines which are extensions of the sides of the vehicle are displayed along with an image captured by the camera, thereby giving the driver guidance on the direction and speed of the vehicle. Since no guidelines are displayed when the vehicle drivers at a speed higher than a predetermined speed, the driver can focus his attention on directly observing the surroundings of the vehicle.

According to the present invention, a speed at or above which guidelines for driving supporting purpose and a predicted path are not displayed is determined so as to match a speed limit imposed on vehicle-mounted equipment. Low-speed driving support can be efficiently effected along with vehicle-mounted equipment. When the vehicle speed of the vehicle increases, it is desirable for the driver to check the surroundings through use of his sight rather than on the basis of information displayed on the display means. Thus, there is prevented diversion of driver's attention, which would otherwise be caused by display means, thus improving safety.

According to the present invention, the length or color of a predicted path is changed in accordance with vehicle speed, thereby enabling appropriate driving in accordance with the driving state of the vehicle.

According to the present invention, the length and color of a predicted curve are changed stepwise in accordance with vehicle speed. Therefore, driving support can be effected while the degree of safety is improved in accordance with vehicle speed.

According to the present invention, the length or color of a predicted path of the vehicle is changed on the basis of the result of detection of an obstacle. In the event of an obstacle being present along the path of the vehicle, an easily-understandable display is providing as the vehicle approaches the obstacle, thus improving safety.

According to the present invention, in the event that obstacle detection means has detected an obstacle, predetermined detection signals corresponding to a plurality of steps are output in accordance with the distance to the obstacle. The length or color of a predicted path to be displayed on display means is changed in response to an output detection signal. The result of detection performed by the obstacle detection means is made to correspond to the display of a path, thus facilitating focusing of attention on an approach to the obstacle.

According to the present invention, even in the case of a vehicle which is not equipped with the function of detecting steering angle, the rotation of a steering shaft can be detected by way of an exposed portion of the steering shaft, and the thus-detected steering angle can be used for predicting a path.

According to the present invention, the rotation state of the steering shaft is detected by a splittable shaft gear. The thus-detected rotating state is transmitted to a detection gear. The rotation state of the detection gear is detected by a steering angle sensor as a variation in steering angle. Therefore, a steering angle can be readily detected from the steering shaft. Although the location of an exposed portion of the steering shaft varies according to the type of the vehicle of interest, a difference in type of vehicle can be compensated for by means of selection of brackets of different shapes. A steering angle sensor is readily mounted on a plurality of types of vehicles, thus rendering the steering sensor sharable among vehicles.

According to the present invention, the shaft gear to be attached to a steering shaft is splittable. Hence, the shaft gear can be easily attached to an exposed portion of the steering shaft. The rotation of state of the steering shaft is transmitted to the detection gear. The steering angle sensor can readily detect the rotation state of the detection gear resulting from rotation of the steering shaft. So long as the shaft gear is formed so as to differ in the number of teeth from the detection gear or such that the number of teeth of the shaft gear is greater than that of the detection gear, the rotation angle of the detection gear becomes greater than that of the steering angle. Therefore, the accuracy of the steering angle detected by the steering angle sensor can be improved.

What is claimed is:

1. A vehicle steering angle detector comprising:
    a steering angle sensor for detecting the amount of angular displacement of a steering shaft at an exposed portion of the steering shaft; and
    a bracket whose base end is secured to a vehicle body in the vicinity of the exposed portion of the steering shaft by a screw used for fixing a bearing of the steering shaft to the vehicle body,
    wherein the steering sensor is attached to a front end of the bracket.

2. The vehicle steering angle detector as defined in claim 1, wherein the bracket has a shape suitable for a shape of the vicinity of the steering shaft of the vehicle so that the steering angle sensor is attached to the front end of the bracket.

3. The vehicle steering angle detector as defined in claim 1, wherein the steering shaft rotates in response to an actuation of a steering wheel.

4. The vehicle steering angle detector as defined in claim 1 further comprising:
    a splittable shaft gear fitted around the exposed portion of the steering shaft; and
    a detection gear rotatably supported by the bracket, the detection gear meshing with the shaft gear,
    wherein a rotation condition of the detection gear is detected by the steering angle sensor.

5. The vehicle steering angle detector as defined in claim 1, wherein the steering angle detector further comprises:
    a shaft gear that is fitted around the steering shaft by way of a spacer, wherein the thickness of the spacer can be adjusted based on the size of the steering shaft.

6. The vehicle steering angle detector as defined in claim 5, wherein the steering angle detector further comprises:
    a detection gear, wherein the steering angle sensor and the detection gear are attached to the bracket and the detection gear meshes with the shaft gear.

7. The vehicle steering angle detector as defined in claim 6, wherein the shaft gear has a greater number of teeth than the detection gear.

8. A vehicle steering angle detector comprising:
a steering angle sensor for detecting the amount of angular displacement of a steering shaft at an exposed portion of the steering shaft;
a bracket whose base end is secured to a vehicle body in the vicinity of the exposed portion of the steering shaft by a screw used for fixing a bearing of the steering shaft to the vehicle body; and
a shaft gear that is fitted around the steering shaft by way of a spacer, wherein the steering sensor is attached to a front end of the bracket and the thickness of the spacer can be adjusted based on the size of the steering shaft such that the steering angle detector is usable with a plurality of different vehicles.

9. The vehicle steering angle detector as defined in claim 8, wherein the bracket has a shape suitable for a shape of the vicinity of the steering shaft of the vehicle so that the steering angle sensor is attached to the front end of the bracket.

10. The vehicle steering angle detector as defined in claim 9, wherein the steering shaft rotates in response to an actuation of a steering wheel.

11. The vehicle steering angle detector as defined in claim 10, wherein the shaft gear is splittable and is fitted around the exposed portion of the steering shaft.

12. The vehicle steering angle detector as defined in claim 11, wherein the bracket comprises:

a steering shaft insert section; and a steering angle sensor mount section.

13. The vehicle steering angle detector as defined in claim 9, wherein the spacer is an elastic spacer made of rubber.

\* \* \* \* \*